Dec. 16, 1952 F. W. KAVANAGH 2,621,557
SPECTROMETRIC APPARATUS FOR DETERMINING
HEMOGLOBIN CONCENTRATIONS AND THE LIKE
Filed Jan. 26, 1951 2 SHEETS—SHEET 1
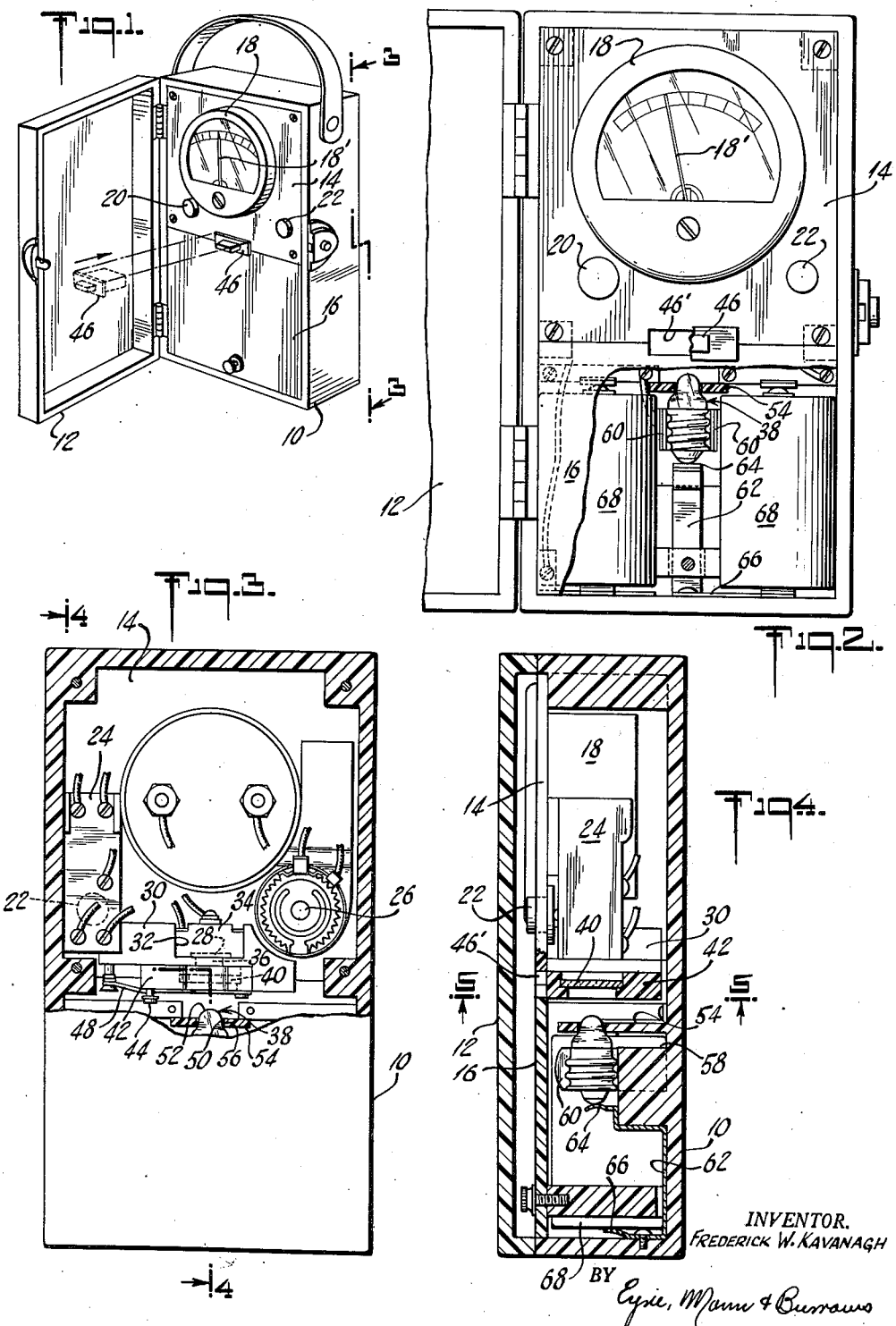
INVENTOR.
FREDERICK W. KAVANAGH
BY Eyre, Mann & Burrows
ATTORNEYS

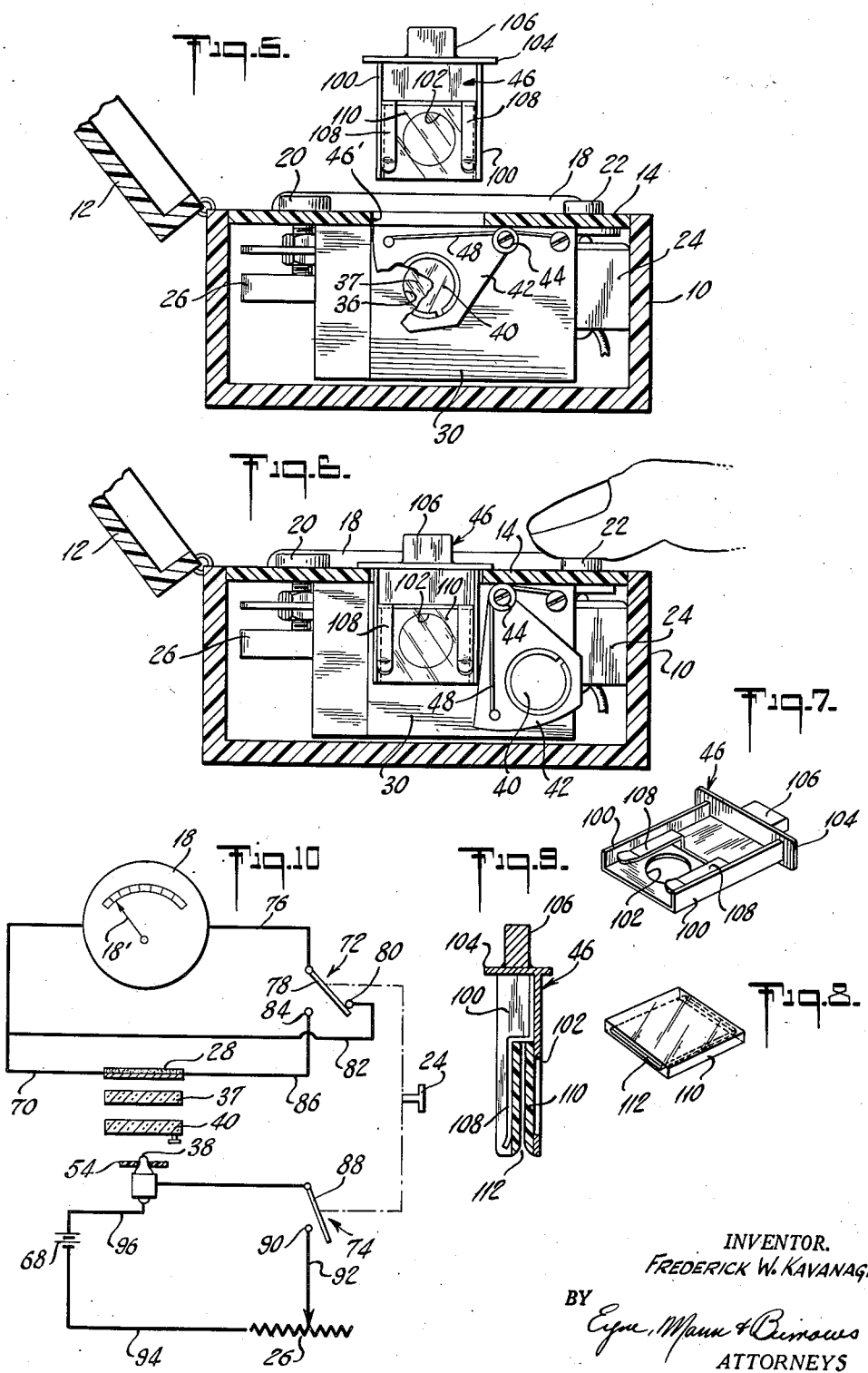

Patented Dec. 16, 1952

2,621,557

UNITED STATES PATENT OFFICE 2,621,557

SPECTROMETRIC APPARATUS FOR DETERMINING HEMOGLOBIN CONCENTRATIONS AND THE LIKE

Frederick W. Kavanagh, New York, N. Y.

Application January 26, 1951, Serial No. 208,022

3 Claims. (Cl. 88—14)

This invention relates to spectrometric apparatus and more particularly to a device for determining the concentration of certain substances in solution. It is particularly useful for determining the hemoglobin concentration in blood.

The present devices for determining the hemoglobin concentration in blood usually comprise means for visually comparing a light beam that passes through a thin layer of hemolyzed blood with a second light beam that is passed through a filter. By adjusting the apparatus so that the intensity of the light of both beams is substantially the same, a reading in terms of hemoglobin content can be obtained. This apparatus is not entirely satisfactory because it has been found that inabilities of the human eye to determine color shades may cause substantial error. In addition, these devices are usually battery-operated and as the batteries run down it becomes difficult to balance the two light beams, with the result that accurate readings can not be obtained. This condition is aggravated by the fact that the readings can not be made rapidly and the battery voltage may change during a test.

This invention overcomes these difficulties and provides a substantially direct reading device that is substantially independent of battery voltage as well as all human errors. Moreover, it provides a compact portable device that enables rapid and accurate determinations of hemoglobin concentration even when small flashlight cells are used as the power supply.

Another object of the invention is a new and improved cuvette whereby the thickness of the layer of hemolyzed blood under test can be more accurately controlled. The thickness of the sample under test determines the transmission characteristics and if excessive variation exists the resultant readings will indicate a higher or lower concentration of hemoglobin than that which actually exists. In addition to the high degree of accuracy attained by the cuvettes in accordance with this invention, the cost of manufacture has been drastically reduced, making it economical to discard them after one use.

The above and other objects will become more apparent in the following description and accompanying drawings forming part of this application.

In the drawings—

Fig. 1 is a perspective view of the apparatus in accordance with the invention;

Fig. 2 is a front elevational view of the invention shown in Fig. 1 with the front cover removed;

Fig. 3 is a cross-sectional view of Fig. 1 taken along the line 3—3 thereof;

Fig. 4 is a cross-sectional view of Fig. 3 taken along the line 4—4 thereof;

Fig. 5 is a cross-sectional view taken along the line 5—5 of Fig. 4;

Fig. 6 is similar to Fig. 5 and shows the disposition of the cuvette in the apparatus during the testing of a blood sample;

Fig. 7 is a perspective view of a cuvette holder in accordance with the invention;

Fig. 8 is a perspective view of a disposable cuvette for use with a holder illustrated in Fig. 7;

Fig. 9 is a cross-sectional view of the cuvette holder of Fig. 7 with the cuvette disposed therein; and Fig. 10 is a circuit diagram of the invention.

Referring to Figs. 1 through 5, 10 denotes the outer casing of the instrument in accordance with the invention, which is provided with a cover 12 that may be closed when the instrument is not in use. The instrument panel comprises upper and lower sections 14 and 16, with the upper section 14 carrying a meter 18 and control knobs 20 and 22. The lower panel section 16 is removable and merely constitutes a cover for the battery compartment which occupies the lower portion of the case 10.

Fig. 3 is a back view of the panel section 14 and shows the disposition of the control switch 24 that is actuated by the push-button 22 and a rheostat 26 actuated by the knob 20 on the front panel. Between the rheostat 26 and the switch 24 is a photovoltaic cell 28 mounted on a support 30 of insulating material and carried by the front panel 14. This voltaic cell is held in position in a recess 32 in the support 30 by a block 34 which, in addition, provides the electrical contact means for connecting the cell into the electrical circuit. The bottom of the recess 32 has an opening 36 coincident with the cell 28 to permit the passage of light from the incandescent lamp 38 onto the cell 28.

As this instrument is particularly intended for use in determining hemoglobin concentrations, a green filter 37 is fitted in the opening 36 to limit the light wavelengths to a band encompassing the absorption bands of hemoglobin in the green region.

Beneath the opening 36 carrying the green filter 37 is a standardizing light absorbing or limiting means 40 carried by a pivoted block 42. This block is generally in the shape of a sector of a circle and is pivoted at 44 so that it may be swung out of the way to permit the entrance of the cuvette holder 46 (see Figs. 5 and 6). When the cuvette holder 46 is removed from the instrument a spring 48 operates to return the standard 40 to the position shown in Fig. 5. Beneath the standard 40 is a flashlight lamp 38 which provides a source of light for the operation of the instrument. It is important that this lamp be properly correlated and axially alined with the optical elements 40, 37 and the photovoltaic cell 28. Although any kind of incandescent source can be used, it is preferable to employ a flashlight bulb having a small neck-like extension 50 and simple convex lens 52 on the end thereof. This type of bulb concentrates more of the light onto the optical system of the instrument than would a conventional bulb that does not embody the lens 52. To insure alinement of the bulb with the optical system an alining plate 54 having an opening 56 therein to accommodate the bulb neck is used. This plate may be fastened to the instrument in any suitable manner or formed integrally with the case 10 during the molding process. The bulb 38 is provided with a screw type base 58 which in this embodiment of the invention is held by a pair of spring clamps 60 that may in turn be spring-mounted to permit the opening 56 in the plate 54 to determine the axial alinement of the bulb. The lamp is held in position against the plate 54 by electrical contact member 62 having a spring-like end portion 64 contacting the tip of the bulb to complete the electrical circuit thereto. This contact member 62 also extends rearwardly as indicated at 66 to contact the base of one of the batteries 68.

The power supply for the instrument comprises a pair of conventional flashlight cells 68 which as seen in Fig. 2 are disposed on each side of the flashlight bulb 38 and its supporting and contacting assembly. In operation, these batteries 68 are connected in series by any suitable method so that a total of about three volts is supplied to illuminate the lamp 38.

Reference is now made to the circuit diagram in Fig. 10 to illustrate the manner in which the various elements are connected and coordinated. The photovoltaic cell 28 is connected to actuate the micrometer 18 directly when the switch 24 is actuated to operate the instrument. The switch 24 preferably consists of two separate switching means indicated generally by the clamps 72 and 74. The switch 72 generally functions to connect the cell 28 to the meter 18 when in the operating position, the lead 70 completing the circuit from the cell to the meter. When the switch is in the inoperative condition it shunts the meter 18 and prevents undue vibration of the armature assembly when not in use. To attain this end the remaining side of the meter is connected through a lead 76 to the switch lever 78 of the switch 72. In the off position of the instrument this lever 78 makes connection with a contact 80 that is connected by means of a lead 82 to the lead 70, thus effecting the short circuit connection. In the operative position of the instrument the lever 78 makes connection with the contact 84 which is connected by means of a lead 86 to the remaining side of the cell 28. This connects the cell directly across the meter 18 when the apparatus is operated.

The remaining switch section 74 is a simple single pole single throw switch. The switch lever 88 is connected to one side of the bulb 38. The other side of the switch 90 is connected by means of lead 92 to the movable arm of the rheostat 26. The return circuit to the lamp consists of the lead 94, the two batteries 68 connected in series, and the lead 96.

In the operation of the instrument the button 22 (Fig. 1) is actuated. This operates the switches 72 and 74 which are contained wtihin the housing 24 and illuminates the lamp 38 and connects the photovoltaic cell 28 across the meter 18. The light from the lamp 38 passes through the light limiting standard 40 and the green filter 37 and energizes the photovoltaic cell 28. While the switch is actuated the rheostat is then adjusted so that the indicating pointer 18' of the meter 18 reaches the desired value on the scale. With the switch in the actuated position a hemolyzed blood sample of predetermined thickness is inserted in place of the filter 40 and the new reading on meter 18, as indicated by the indicator 18', is then recorded. The difference between these two readings is used to determine the concentration of hemoglobin in the blood sample. For this purpose the meter scale may be calibrated in per cent hemoglobin or a chart may be provided to avoid complicated computations. As there are several methods for defining hemoglobin concentration in blood, a cross-reference chart may also be provided.

With reference to the standardizing light limiting or absorbing filter 40, this standardizing means is perferably arranged to limit the light transmission to a value approximately equal to the light transmission characteristics of an average hemolyzed blood sample. The standardizing means may be in the form of a neutral density filter, a screen or mesh of any suitable material or other means for limiting the transmission of light within the range to be used for test purposes. In this particular instance the green filter 37 limits the light falling on the voltaic cell to a particular band in the green region of the spectrum and therefore the light limiting means, if it be a filter, need only affect that range of the spectrum.

In the testing of the sample, it is preferable to recheck the meter reading after the sample has been removed to see that the meter returns to the reading originally set. In this way a weak battery will be immediately detected and thus avoid any possible errors by reason of a reduction in light of the bulb 38 during the interval between the setting of the standard reading and the insertion of the blood sample and recording of that reading.

In the foregoing embodiment of the invention it was pointed out that the switch 24 is actuated by a button 22 on the front face of the instrument panel 14. To further simplify the operation of this invention the switch 24 may be arranged so that its actuating lever is positioned in the path of the slot 46' that receives the cuvette holder 46. In this way when a test is to be made, the cuvette holder would be inserted part way into the slot 46', at which point the light would be turned on and the instrument placed in operative condition. After the reading is adjusted as previously described by rotating the knob 20, the cuvette holder could then be inserted all the way to displace the standardizing means 40 to obtain the second meter reading. The instrument is then turned off merely by extraction of the cuvette holder 46 and is ready for the next test.

The cuvette holder 46 consists of a short channel-shaped base 100 having an opening 102 therein through which light from the bulb 38 may pass when it is positioned in place of the filter 40. A front plate 104 is fastened to one end of the channel and the distance between this plate 104 and the center of the hole 102 is determined so that it will aline itself with the lamp 38 and the filter 37 to permit the light to pass therethrough. A small knob 106 is secured to the outside of the plate 104 to facilitate handling of the holder. Within the channel member 100 are two clips 108 adapted to receive and hold a cuvette such, for instance, as the cuvette 110 illustrated in Fig. 8.

The cuvette constitutes an important link in the apparatus as the thickness of the blood sample to be tested directly determines the accuracy with which the test may be made. The cuvette in accordance with this invention comprises a plastic housing of a relatively stable material such as vinylite or the like and having a narrow opening 112 extending therethrough and into which the blood sample to be tested is inserted. This opening must be of the order of a few thousandths of an inch thick and must be accurately controlled. By forming the curvette of plastic and using an accurately gauged metal core in the mold to form the opening 112, a highly accurate curvette is formed. Moreover, by fabricating this item of plastic the cost is reduced to a point that will permit cuvettes to be discarded after a single use, thus avoiding the necessity for difficult and time consuming washing or cleansing operations.

I claim:

1. Apparatus for determining the concentration of hemoglobin in the blood, comprising direct reading indicating means responsive to indicate the intensity of a beam of light falling thereon, an incandescent lamp and a source of electric power therefor for actuating said means, a filter between said lamp and said means to limit the band of wavelengths falling on said cell to a band encompassing hemoglobin absorption bands in the green region of the spectrum, a displaceable light limiting means between said lamp and the first said filter, said displaceable means adapted to be moved out of the path of the light beam upon insertion of the blood sample to be tested and to return to its initial position upon removal of the blood sample, and a lamp alining means comprising a baffle having an opening therein to receive a portion of the lamp envelope and hold it in alinement with the cell.

2. Apparatus for determining the concentration of hemoglobin in the blood, comprising a microammeter, a photovoltaic cell, connections between said cell and said meter for actuating said microammeter in response to light falling on said cell, switch means in circuit with said microammeter and cell that in one position disconnects one side of the cell from the meter and short-circuits the meter, and in another position disconnects the short-circuit across the meter and connects the cell to the meter for the actuation thereof, an incandescent lamp, a source of electric power to illuminate the lamp, a rheostat in circuit with the source and lamp to control the intensity of illumination of the lamp, switch means in said circuit for opening and closing it, a filter between the light source and the cell for limiting the band of wavelengths falling on said cell to that band comprehending the green absorption lines of hemoglobin, a displaceable light limiting standard in said light beam including a holder pivoted for movement out of the path of the light beam upon the insertion of a blood sample to be tested, spring means on said holder to return it to its position in the light beam upon removal of said specimen, a lamp alining means comprising a baffle having an opening therein to receive a portion of the lamp envelope and hold it in alinement with the cell, said switches being coordinated so that when the lamp circuit switch is in the open position the meter switch is in said one position and when the lamp circuit switch is in the closed position to illuminate the lamp the meter circuit switch is in said other position.

3. Apparatus according to claim 2 wherein said switch is actuated upon partial insertion of the specimen to be tested and with the holder in position in the light beam.

FREDERICK W. KAVANAGH.

REFERENCES CITED

The following references are of record in the file of this patent:

UNITED STATES PATENTS

| Number | Name | Date |
|---|---|---|
| 1,940,373 | Schoenberg | Dec. 19, 1933 |
| 1,963,342 | Whitson et al. | June 19, 1934 |
| 1,967,583 | McFarlane et al. | July 24, 1934 |
| 2,015,949 | Maw | Oct. 1, 1935 |
| 2,056,791 | Logan | Oct. 6, 1936 |
| 2,127,477 | Carpenter et al. | Aug. 16, 1938 |
| 2,193,315 | Evelyn | Mar. 12, 1940 |
| 2,258,073 | Stevens | Oct. 7, 1941 |
| 2,282,741 | Parker | May 12, 1942 |
| 2,355,960 | Duffie | Aug. 15, 1944 |
| 2,396,260 | Gradisar et al. | Mar. 12, 1946 |
| 2,442,462 | Kirschbaum | June 1, 1948 |
| 2,482,650 | Brown et al. | Sept. 20, 1949 |
| 2,486,956 | Lundberg | Nov. 1, 1949 |
| 2,519,997 | Brown | Aug. 22, 1950 |

FOREIGN PATENTS

| Number | Country | Date |
|---|---|---|
| 246,050 | Germany | Apr. 23, 1912 |